US008611330B2

(12) United States Patent
Yoo (10) Patent No.: US 8,611,330 B2
(45) Date of Patent: Dec. 17, 2013

(54) DIGITAL MULTIMEDIA LOCAL AREA WIRELESS TRANSMISSION SYSTEM AND LOCAL AREA WIRELESS TRANSMISSION METHOD USING THE SAME

(75) Inventor: Chang-Nam Yoo, Seoul (KR)

(73) Assignee: Laon Technology Co., Ltd., Gyeonggi-Do (KR)

( * ) Notice: Subject to any disclaimer, the term of this patent is extended or adjusted under 35 U.S.C. 154(b) by 485 days.

(21) Appl. No.: 12/676,994

(22) PCT Filed: Sep. 17, 2008

(86) PCT No.: PCT/KR2008/005480
§ 371 (c)(1),
(2), (4) Date: Mar. 8, 2010

(87) PCT Pub. No.: WO2009/038333
PCT Pub. Date: Mar. 26, 2009

(65) Prior Publication Data
US 2011/0002315 A1     Jan. 6, 2011

(30) Foreign Application Priority Data
Sep. 18, 2007  (KR) .................. 10-2007-0094853

(51) Int. Cl.
*H04J 3/06* (2006.01)
(52) U.S. Cl.
USPC ........................................ 370/350
(58) Field of Classification Search
None
See application file for complete search history.

(56) References Cited

U.S. PATENT DOCUMENTS

| | | | | |
|---|---|---|---|---|
| 6,804,527 B2* | 10/2004 | Struhsaker et al. | ............ | 370/350 |
| 6,993,009 B2* | 1/2006 | Kelly et al. | ................... | 370/350 |
| 7,336,602 B2* | 2/2008 | Silvester | ........................ | 370/216 |
| 2001/0024165 A1* | 9/2001 | Steen et al. | .................... | 455/420 |
| 2003/0203719 A1* | 10/2003 | Barrett et al. | .............. | 455/67.11 |
| 2004/0212533 A1* | 10/2004 | Whitehead et al. | ....... | 342/357.08 |
| 2005/0181752 A1* | 8/2005 | Sahota | .......................... | 455/132 |
| 2007/0280237 A1* | 12/2007 | Shin et al. | ..................... | 370/390 |
| 2008/0291855 A1* | 11/2008 | Bata et al. | ..................... | 370/311 |
| 2010/0098183 A1* | 4/2010 | Thomson et al. | ............ | 375/262 |

FOREIGN PATENT DOCUMENTS

| | | |
|---|---|---|
| CN | 1489148 A | 4/2004 |
| KR | 2002-94534 A | 12/2002 |
| KR | 2003-68737 A | 8/2003 |
| WO | WO99/09710 | 2/1999 |
| WO | WO02/087275 A2 | 10/2002 |

OTHER PUBLICATIONS

International Search Report for PCT/KR2008/005480 dated Feb. 26, 2009.
Corresponding Chinese Office Action (issued by SIPO) dated Jul. 20, 2012, and English Translation.

* cited by examiner

*Primary Examiner* — Anh-Vu Ly
(74) *Attorney, Agent, or Firm* — Duane Morris LLP (57) ABSTRACT

A local area wireless transmission system includes: at least one transmitter transmitting a multimedia data signal with a first speed; at least one receiver receiving the multimedia data signal; and at least one master receiver transmitting a synchronization control signal with a second speed lower than the first speed, the at least one master receiver receiving the multimedia data signal from the at least one transmitter wirelessly and from the at least one receiver wiredly.

18 Claims, 7 Drawing Sheets

*FIG. 6* received multimedia data signal in first receiver

| first block (err) | second block | third block | fourth block (err) | ... | $n^{th}$ block | Tail |
|---|---|---|---|---|---|---| received multimedia data signal in second receiver

| first block | second block (err) | third block | fourth block (err) | ... | $n^{th}$ block | Tail |
|---|---|---|---|---|---|---| received multimedia data signal in third receiver

| first block | second block (err) | third block (err) | fourth block (err) | ... | $n^{th}$ block | Tail |
|---|---|---|---|---|---|---|

↓ error-recovered multimedia data signal in master receiver

| first block | second block | third block | fourth block | ... | $n^{th}$ block | Tail |
|---|---|---|---|---|---|---|

DIGITAL MULTIMEDIA LOCAL AREA WIRELESS TRANSMISSION SYSTEM AND LOCAL AREA WIRELESS TRANSMISSION METHOD USING THE SAME

CROSS-REFERENCE TO RELATED PATENT APPLICATIONS

The present application is a U.S. National Stage Application under 35 U.S.C. §371 of PCT Application No. PCT/KR2008/005480, filed Sep. 17, 2008, the entirety of which is incorporated herein by reference.

This application claims the benefit of Korean Patent Application No. 2007-0094853, filed on Sep. 18, 2007, which is hereby incorporated by references in its entirety.

TECHNICAL FIELD

The present invention relates to a local area wireless transmission system, and more particularly, to a digital multimedia local area wireless transmission system including a receiver receiving a wireless signal from a transmitter and a master receiver connected to the receiver wiredly where a synchronization control frame and a multimedia transmission frame are divided and local area wireless transmission method using the system.

BACKGROUND

Recently, various low power wireless devices using an industrial, scientific and medical (ISM) band and an unlicensed national information infrastructure (UNII) band that are useful without a license have been researched and developed. Specifically, an audio wireless transmitting device such as a wireless microphone, a wireless headphone and a wireless speaker uses the ISM band or the UNII band. In addition, a digital video wireless transmitting device such as a wireless internet broadcasting and a wireless surveillance camera uses a wireless technology such as a wireless local area network (LAN), a Bluetooth and a frequency shift keying (FSK) transceiver. Moreover, a standard IEEE 802.11n that expands a distance of a wireless LAN using a multiple-in multiple-out (MIMO) antenna has been suggested and an access point (AP) device using the MIMO technology has been come out.

However, since the ISM band or the UNII band is utilized without any limitation in usages and authorities, a transmission quality may be severely deteriorated due to interference when various application devices are simultaneously used in a given area. Further, even when a single application device is used in a given area, a fading phenomenon due to a multi-path signal reflecting on adjacent surroundings occurs because of a transmission method using a low power and a high frequency. As a result, the transmission quality is deteriorated and the transmission range is restricted. In addition, since the sensitivity varies according to direction, various digital wireless devices have not been suggested and released sufficiently in an application device field requiring a realtime transmission of high quality. For example, a wireless microphone for a karaoke, a broadcasting, a stage or a conference may have an infrared type or an analog type. The analog wireless microphone has disadvantages such as a poor sound quality, a limitation of simultaneous users due to insufficient channels and a low value added functions of various requirements, e.g., an additional information exchange. However, since the problems of the digital wireless microphone such as a limitation in transmission range and an error due to a fading phenomenon by a multi-path are not solved, the analog wireless microphone is still widely used.

To solve the above problems, a transmission method using a MIMO antenna and a diversity method of frequency, time or antenna where a transmission speed is improved and audio/video of non-compressed high quality are transmitted have been suggested. As a result, transmission range is improved as compared with a wireless LAN according to the related art. However, the device transmitting a high frequency signal in the ISM band or UNII band with a relatively low power has substantial limits in a transmission range, and the errors due to the fading phenomenon are not improved. In addition, an ultra wide band (UWB) technology that is recently commercialized in an audio field has a disadvantage such that the transmission range is relatively short as compared with a wireless LAN.

SUMMARY

Accordingly, the present invention is directed to a local area wireless transmission system and a local area wireless transmission method using the system that substantially obviate one or more of the problems due to limitations and disadvantages of the related art.

An object of the present invention is to provide a local area wireless transmission system where a transmission range of a digital multimedia data is expanded and a transmission quality is improved and a local area wireless transmission method using the system.

A local area wireless transmission system includes: at least one transmitter transmitting a multimedia data signal; at least one receiver receiving the multimedia data signal; and at least one master receiver receiving the multimedia data signal from the at least one transmitter wirelessly and from the at least one receiver wiredly, the at least one master receiver transmitting a synchronization signal.

The at least one transmitter transmits the multimedia data signal with a first speed, and the at least one master receiver transmits the synchronization control signal with a second speed lower than the first speed.

The at least one master receiver recover errors of the multimedia data signal by comparing the multimedia data signal wirelessly received from the at least one transmitter and the multimedia data signal wiredly received from the at least one receiver In addition, the at least one master receiver includes: a wired interfacing unit receiving the multimedia data signal from the at least one receiver wiredly; a wireless receiving unit receiving the multimedia data signal from the at least one transmitter; a wireless transmitting unit transmitting the synchronization control signal; an error recovery calculating unit recovering errors in the multimedia data signal received by one of the wired interfacing unit and wireless receiving unit; and a codec unit converting a digital type of the multimedia data signal in the error recovery calculating unit into an analog type.

Further, the at least one master receiver includes a plurality of master receivers corresponding to a plurality of frequencies, respectively, and the at least one transmitter includes a frequency selecting unit selecting one of the plurality of frequencies.

Moreover, wherein the at least one receiver includes: a wireless receiving unit receiving the synchronization control signal from the at least one master receiver and the multimedia data signal from the at least one transmitter; a controlling unit controlling the wireless receiving unit and keeping a network synchronization using the synchronization control signal; an error recovery calculating unit recovering errors in the multimedia data signal; and a wired interfacing unit transmitting the multimedia data signal to the at least one master receiver wiredly.

The at least one receiver further comprises a wireless transmitting unit communicating with the at least one master receiver.

The at least one transmitter includes: an analog signal inputting unit receiving the multimedia data signal from a wireless multimedia device; a codec unit converting an analog type of the multimedia data signal into a digital type; a wireless transmitting unit transmitting the multimedia data signal to the at least one master receiver and the at least one receiver; a wireless receiving unit receiving the synchronization control signal from the at least one master receiver; and a controlling unit controlling the wireless transmitting unit and the wireless receiving unit and keeping a network synchronization using the synchronization control signal.

In addition, a transmission range of the synchronization control signal is greater than a transmission range of the multimedia data signal.

In another aspect, a local area wireless transmission system includes: at least one transmitter transmitting a multimedia data signal with a first speed; at least one receiver receiving the multimedia data signal; and at least one master receiver receiving the multimedia data signal and transmitting a synchronization signal with a second speed lower than the first speed.

In another aspect, a local area wireless transmission method for a digital multimedia data includes: transmitting a multimedia data signal by at least one transmitter; receiving the multimedia data signal by at least one receiver; and receiving the multimedia data signal from the at least one transmitter wirelessly and from at least one receiver connected to the at least one master receiver wiredly by at least one master receiver and transmitting a synchronization control signal by the at least one master receiver to form a network synchronization.

The at least one transmitter transmits the multimedia data signal with a first speed, and the at least one master receiver transmits the synchronization control signal with a second lower than the first speed.

The local area wireless transmission method further includes recovering errors in the multimedia data signal received from the at least one transmitter and the at least one receiver.

In addition, the at least one transmitter includes a plurality of transmitters transmitting the multimedia data signal by a time division type.

The at least one master receiver recovers errors in the multimedia data signal by comparing blocks of the multimedia data signal received by the at least one transmitter and the at least one receiver and selecting the blocks without the errors. Further, the at least one master receiver recovers the errors in the multimedia data signal by a forward error correction (FEC) method when all the blocks of the multimedia data signal have the errors.

In another aspect, a local area wireless transmission method for a digital multimedia data includes: transmitting a multimedia data signal with a first speed by at least one transmitter; receiving the multimedia data signal by at least one receiver; and receiving the multimedia data signal and transmitting a synchronization control signal with a second speed lower than the first speed by the at least one master receiver to form a network synchronization.

BRIEF DESCRIPTION OF THE DRAWINGS

The accompanying drawings, which are included to provide a further understanding of the invention and are incorporated in and constitute a part of this specification, illustrate embodiments of the invention.

DETAILED DESCRIPTION OF THE PREFERRED EMBODIMENTS

Reference will now be made in detail to embodiments which are illustrated in the accompanying drawings. Wherever possible, similar reference numbers will be used to refer to the same or similar parts.

In a local area wireless transmission system according to the present invention, a problem of a limitation in transmission range due to high speed transmission of a multimedia data frame is solved by connecting at least one receiver to a master receiver with a cable. In addition, a problem of a transmission quality due to a fading phenomenon is solved by recovering errors using a duplicate data frame that a master receiver receives.

Figure 1:
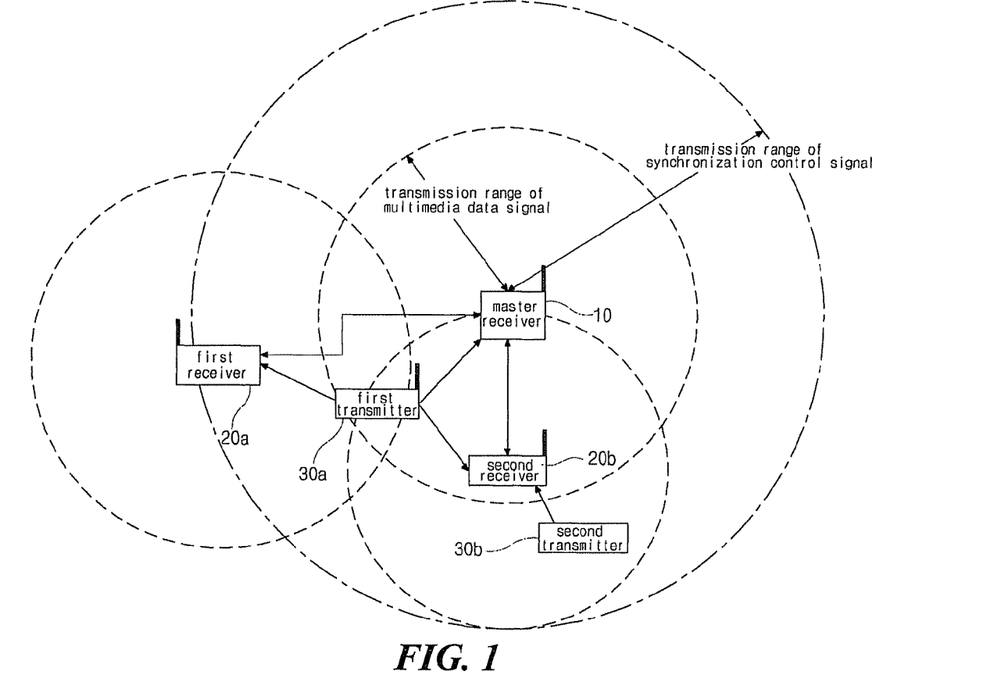
FIG. 1 is a local area wireless transmission system according to an embodiment of the present invention.

FIG. 1 is a local area wireless transmission system according to an embodiment of the present invention.

In FIG. 1, a local area wireless transmission system includes a master receiver 10, a first receiver 20a, a second receiver 20b, a first transmitter 30a and a second transmitter 30b. The first and second receivers 20a and 20b communicate with the master receiver 10 with a line, a wire or a cable. In addition, the first and second transmitters 30a and 30b transmit a multimedia data. Although the local area wireless transmission system of FIG. 1 includes one master receiver, two receivers and two transmitters, the wireless transmission system according to another embodiment of the present invention may include a plurality of master receivers, at least one receiver and at least one transmitter.

The master receiver 10 transmits a synchronization control signal with a relatively low speed to keep synchronization of the wireless transmission system. Further, the master receiver 10 wirelessly receives a multimedia data signal that is transmitted with a relatively high speed directly from the first and second transmitters 30a and 30b or wiredly receives the multimedia data signal from the first and second receivers 20a and 20b. The master receiver 10 recovers errors of the multimedia data signal and outputs the recovered multimedia data signal through an output means such as a speaker and monitor. Accordingly, a multimedia transmission frame for a data transmission with a relatively high speed is divided from a synchronization control frame for a network synchronization in the system. Since the transmission range of the synchronization control signal is greater than the transmission range of the multimedia data signal, a network synchronization area of the local area wireless transmission system is expanded due to the synchronization control frame transmitted with a relatively low speed. Further, since the multimedia transmission frame is transmitted with a relatively high speed from the first and second transmitters 30a and 30b, a stable transmission throughput is obtained and a multimedia data including uncompressed high quality audio is reliably transmitted.

The locations of the first and second receivers 20a and 20b and the first and second transmitters 30a and 30b and the distances between two of the first and second receivers 20a and 20b and the first and second transmitters 30a and 30b may be determined according to various factors such as movement of the first and second transmitters 30a and 30b, a distance from the master receiver 10, a transmission range, a wireless environment and reliability of product. For example, since the first transmitter 30a is disposed in a transmission range of the multimedia data signal of each of the master receiver 10, the first receiver 20a and the second receiver 20b, each of the master receiver 10, the first receiver 20a and the second receiver 20b may receive the multimedia data signal directly from the first transmitter 30a. The master receiver 10 recovers the errors using the multimedia data signal received directly from the first transmitter 30a and the multimedia data signal that each of the first and second receivers 20a and 20b receives. Since the second transmitter 30b is disposed in a transmission range of the multimedia data signal of the second receiver 20b, the second receiver 20b receives the multimedia data signal transmitted from the second transmitter 30b and the multimedia data signal is transmitted from the second receiver 20b to the master receiver 10 wiredly.

Figure 2:
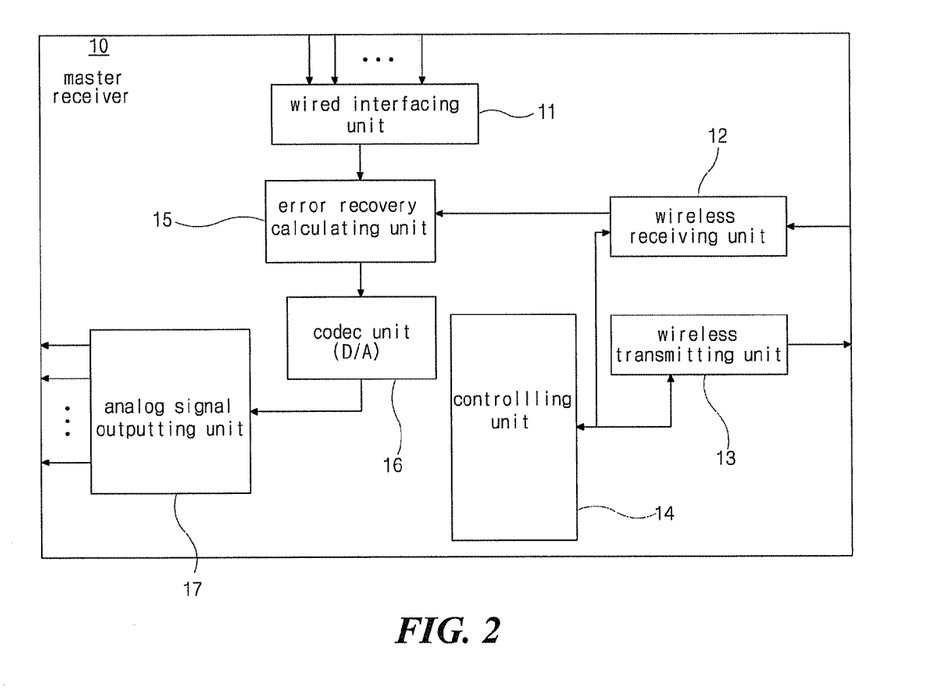
FIGS. 2, 3 and 4 are block diagrams showing a master receiver, a receiver and a transmitter, respectively, of a local area wireless transmission system according to an embodiment of the present invention.
Figure 3:
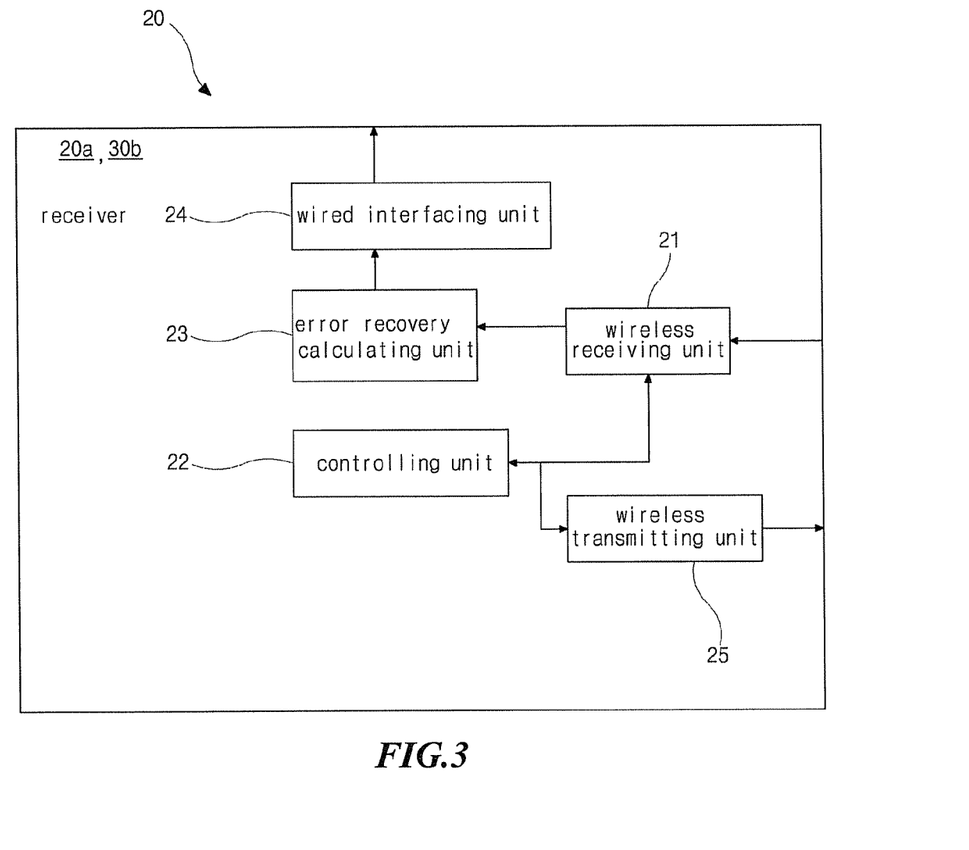
Figure 4:
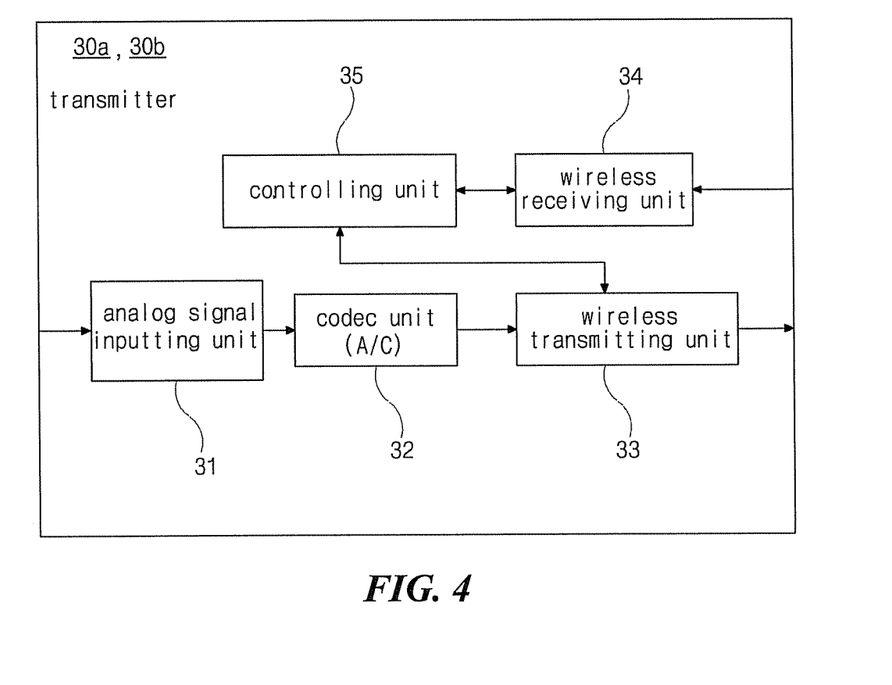

FIGS. 2, 3 and 4 are block diagrams showing a master receiver, a receiver and a transmitter, respectively, of a local area wireless transmission system according to an embodiment of the present invention.

In FIG. 2, the master receiver 10 includes a wired interfacing unit 11, a wireless receiving unit 12, a wireless transmitting unit 13, a controlling unit 14, an error recovery calculating unit 15, a codec unit 16 and a analog signal outputting unit 17. The wired interfacing unit 11 wiredly receives the multimedia data signal from the first and second receivers 20a and 20b. The wireless receiving unit 12 wirelessly receives the multimedia data signal directly from the first and second transmitters 30a and 30b. The wireless transmitting unit 13 transmits the synchronization control signal for keeping a network synchronization. Specifically, the synchronization control signal is transmitted with a relatively low speed to expand the network area. For example, when the synchronization control signal is transmitted with a transmission speed of about 6 Mbps, the synchronization control signal may have a transmission range of about 700 m. Accordingly, the first and second receivers 20a and 20b and the first and second transmitters 30a and 30b inside a transmission range of about 700 m with the master receiver 10 as a center are synchronized with the master receiver 10.

Since the multimedia data signal is transmitted from the first and second transmitters 30a and 30b with a relatively high speed as compared with the synchronization control signal, the multimedia data signal has a smaller transmission range than the synchronization control signal. For example, when the multimedia data signal is transmitted with a transmission speed of about 24 Mbps, the multimedia data signal may have a transmission range of about 350 m. The available transmission range may be further reduced because of reliability of the multimedia data signal. For stably transmitting the multimedia data signal from the first and second transmitters 30a and 30b to the master receiver 10, the positions of the first and second receivers 20a and 20b are determined by a network area based on positions and mobility of the first and second transmitters 30a and 30b.

The controlling unit 14 controls the wireless receiving unit 12 receiving the multimedia data signal and the wireless transmitting unit 13 transmitting the synchronization control signal. The error recovery calculating unit 15 recovers errors in the multimedia data signal received through the wired interfacing unit 11 and the wireless receiving unit 12. The codec unit 16 converts a digital type of the error-recovered multimedia data signal into an analog type, and the analog signal outputting unit 17 outputs the multimedia data signal of the analog type to an output means where the multimedia data signal is replayed.

The wired interfacing unit 11, the error recovery calculating unit 15, the codec unit 16 and the analog signal outputting unit 17 may be integrated as a modulized product or a chip. The master receiver 10 may be integrated with the output means such as a speaker and a monitor, or may be formed separately from the output means. In addition, the master receiver 10 may communicate information regarding a communication environment with the first and second receivers 20a and 20b.

In FIG. 3, each of the first and second receivers 20a and 20b includes a wireless receiving unit 21, a controlling unit 22, an error recovery calculating unit 23 and a wired interfacing unit 24. The wireless receiving unit 21 wirelessly receives the synchronization control signal from the master receiver 10 and the multimedia data signal from the first and second transmitters 30a and 30b. The controlling unit 22 controls the wireless receiving unit 21 and keeps the network synchronization using the synchronization control signal. The error recovery calculating unit 23 recovers errors in the multimedia data signal and the wired interfacing unit 24 wiredly transmits the error-recovered multimedia data signal to the master receiver 10. Since the multimedia data signal is wiredly transmitted from each of the first and second receivers 20a and 20b to the master receiver 10 with a relatively high speed, the multimedia data is stably transmitted to the master receiver 10. Each of the first and second receivers 20a and 20b may further include the wireless transmitting unit 25 for communicating information regarding a communication environment with the master receiver 10 and the first and second transmitters 30a and 30b, and the wireless receiving unit 21 the wireless transmitting unit 25 may be controlled by the controlling unit 22.

In FIG. 4, each of the first and second transmitters 30a and 30b includes an analog signal inputting unit 31, a codec unit 32, a wireless transmitting unit 33, a wireless receiving unit 34 and a controlling unit 35. The analog signal inputting unit 31 receives the multimedia data signal of an analog type from a wireless multimedia device such as a wireless audio device and a wireless video device and the codec unit 32 converts the analog type of the multimedia data signal into a digital type. The wireless transmitting unit 33 transmits the multimedia data signal of the digital type, and the controlling unit 35 controls the wireless transmitting unit 33.

The wireless transmitting unit 33 of each of the first and second transmitters 30a and 30b transmits the multimedia data signal with a relatively high speed as compared with the synchronization signal of the master receiver 10. The limitation in the transmission range due to the relatively high transmission speed is overcome by the first and second receivers 20a and 20b connected to the master receiver 10 with a line, a wire or a cable. In addition, the fading phenomenon due to the relatively high transmission speed is prevented by the error recovery process in the master receiver 10.

The wireless receiving unit 34 receives the synchronization control signal from the master receiver 10, and the control unit 35 controls the wireless transmitting unit 33 and the wireless receiving unit 34 to keep the network synchronization using the synchronization control signal. Each of the first and second transmitters 30a and 30b may be integrated in a wireless audio device such as a wireless microphone and a wireless video device such as a wireless camera.

Figure 5:
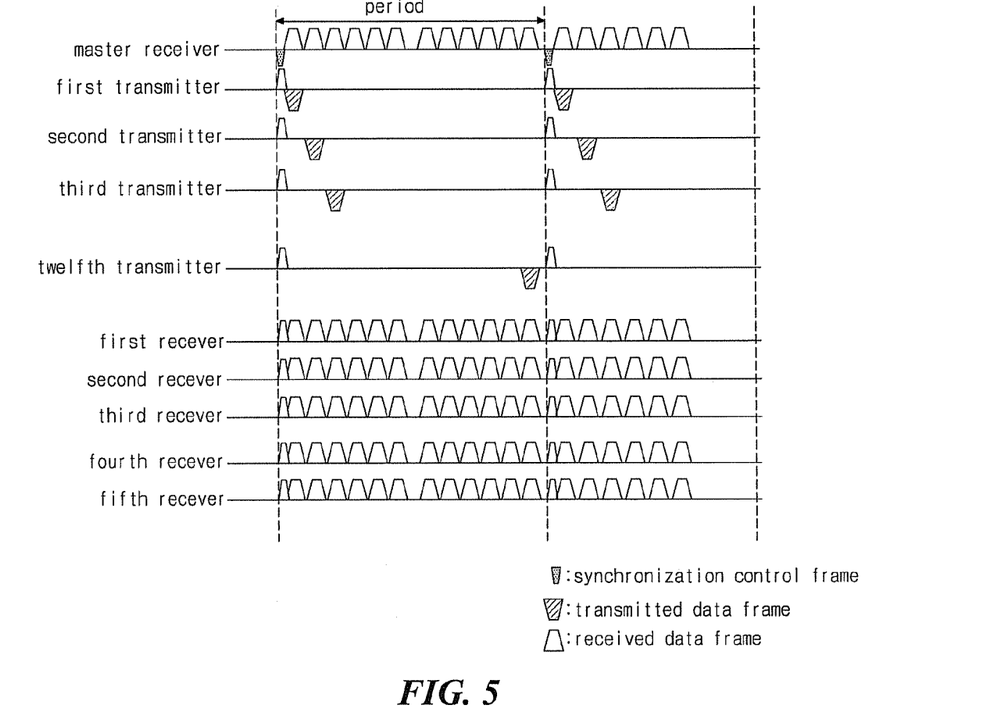
FIG. 5 is a timing chart showing a transmission frame for a digital multimedia data by a time division type for a local area wireless transmission system according to another embodiment of the present invention.
Figure 6:
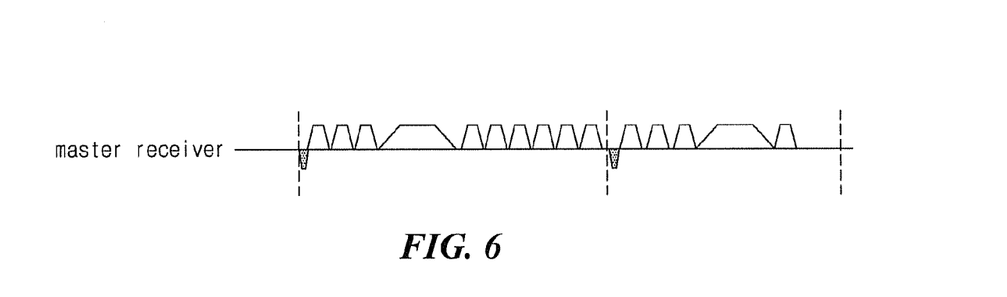
FIG. 6 is a timing chart showing a transmission frame of a digital multimedia data having a variable frame structure according to another embodiment of the present invention.

The multimedia data signal may be processed by a time division type or may include a variable frame structure according to application. FIG. 5 is a timing chart showing a transmission frame for a digital multimedia data by a time division type for a local area wireless transmission system according to another embodiment of the present invention, and FIG. 6 is a timing chart showing a transmission frame of a digital multimedia data having a variable frame structure according to another embodiment of the present invention.

In FIG. 5, the first to twelfth transmitters synchronized with the synchronization control signal of the master receiver transmit the multimedia data signals by a time division type such that a synchronization control frame and a data frame of the transmission frame including for a digital multimedia data are transmitted at different timings. The master receiver and each of the first to fifth receivers sequentially receive the data frames of the multimedia data signals from the first to twelfth transmitters in a single period. In FIG. 6, each transmitter transmits a synchronization frame and a data frame of the transmission frame for the digital multimedia data having a variable data frame, and the master receiver receives the multimedia data signal having a variable data frame.

Figure 7:
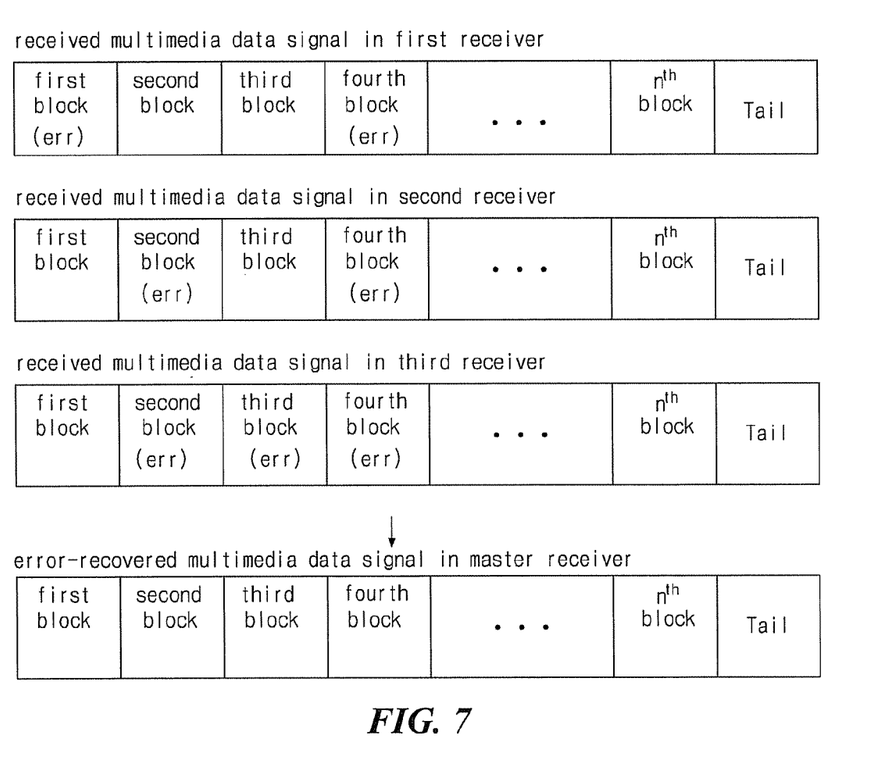
FIG. 7 is view showing an error recovery process using duplicated multimedia data signals for a local area wireless transmission system according to another embodiment of the present invention.

The master receiver 10 receives the duplicate multimedia data signal from the at least one receiver as well as from the at least one transmitter. The errors in the multimedia data signal due to a fading phenomenon are recovered using the duplicate multimedia data signal. FIG. 7 is view showing an error recovery process using duplicated multimedia data signals for a local area wireless transmission system according to another embodiment of the present invention.

In FIG. 7, the first, second and third receivers 20a, 20b and 20c simultaneously receives the multimedia data signals each having first to $n^{th}$ blocks from the transmitter. The multimedia data signal may have errors in different blocks. For example, the multimedia data signal of the first receiver 20a may have the errors in the first and fourth blocks. In addition, the multimedia data signal of the second receiver 20b may have the errors in the second and fourth blocks, and the multimedia data signal of the third receiver 20c may have the errors in the second, third and fourth blocks. The error recovery calculating unit 15 of the master receiver 10 receives and compares the multimedia data signals of the first, second and third receivers 20a, 20b and 20c. Next, the error recovery calculating unit 15 selects blocks having no errors to constitute the multimedia data signal including the first to $n^{th}$ blocks without the errors. For example, the error recovery calculating unit 15 may select the first block of the multimedia data signal of the second or third receiver 20b or 20c, and may select the second block of the multimedia data signal of the first receiver 20a. In addition, the error recovery calculating unit 15 may select the third block of the multimedia data signal of the first or second receiver 20a or 20b. When all the multimedia data signals of the first, second and third receivers 20a, 20b and 20c have the errors in a given block such as the fourth block, the errors of the given block may be recovered using a forward error correction (FEC) method. The coding rate of an FEC method may be determined by the number of the receivers. For example, the errors may be recovered using an FEC method having a coding rate of ⅔ per byte in the wireless transmission system including three receivers, and the errors may be recovered using an FEC method having a coding rate of ⅗ per byte in the wireless transmission system including five receivers. As a result, the error recovery calculating unit 15 may constitute the multimedia data signal including perfect blocks.

Figure 8:
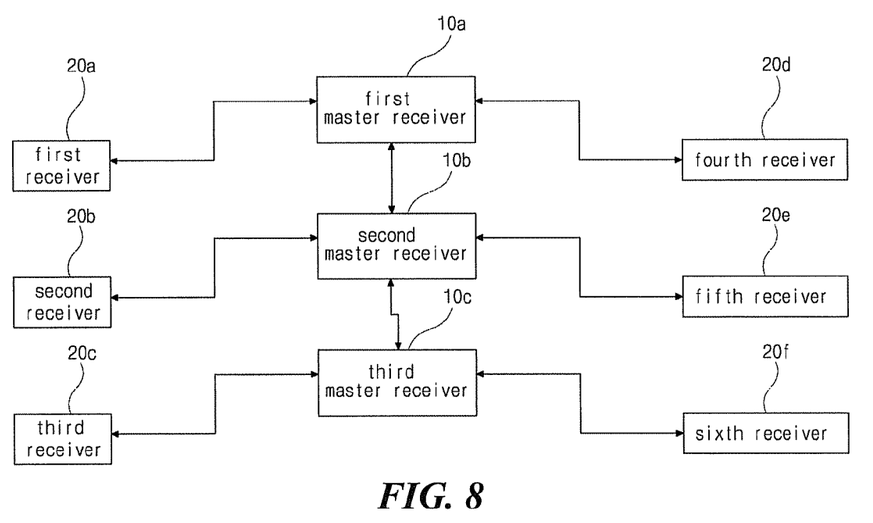
FIG. 8 is a block diagram showing a local area wireless transmission system including a plurality of master receivers according to another embodiment of the present invention.

The local area wireless transmission system may include a plurality of master receivers using different frequencies. FIG. 8 is a block diagram showing a local area wireless transmission system according to another embodiment of the present invention.

In FIG. 8, the wireless transmission system includes first, second and third master receivers 10a, 10b and 10c and first, second, third, fourth, fifth and sixth receivers 20a, 20b, 20c, 20d, 20e and 20f to expand the transmission capacity of the system. The first and fourth receivers 20a and 20d are wiredly connected to the first master receiver 10a, the second and fifth receivers 20b and 20e are wiredly connected to the second master receiver 10b, and the third and sixth receivers 20c and 20f are wiredly connected to the third master receiver 10c. The first, second and third master receivers 10a, 10b and 10c may correspond to first, second and third frequencies. Although not shown in FIG. 8, each transmitter may include a frequency selecting unit. The frequency selecting unit may select one of the first, second and third frequencies for the multimedia data signal according to the selected master receiver. The first, second and third master receivers 10a, 10b and 10c may extract the multimedia data signal corresponding to first, second and third frequencies, respectively, and may output the error-recovered multimedia data signal through the output means. Further, the first, second and third master receivers 10a, 10b and 10c may be wiredly connected to each other to communicate information regarding the first, second and third frequencies. Since the first, second and third master receivers 10a, 10b 10c independently operate with the first, second and third frequencies, concurrent users for the wireless transmission system may be expanded.

Consequently, in the local area wireless transmission system, since the synchronization control signal is transmitted with a relatively low speed and the multimedia data signal is transmitted with a relatively high speed, a network area is expanded. In addition, since the errors are recovered by comparing the multimedia data signals of at least one master receiver and at least one receiver, an uncompressed high quality digital multimedia data is stably transmitted. Accordingly, a local area wireless transmission system for a reliable high quality digital multimedia data may be provided in a wireless audio field such as a wireless microphone, a wireless headset and a wireless speaker and a wireless video field such as a wireless camera without a limitation in a transmission range and receiving errors. Specifically, the problems such as a limitation in a transmission range due to a low power and a high frequency and receiving errors due to a fading phenomenon in a local area wireless transmission system for a digital multimedia data such as a wireless LAN, a Bluetooth and an FSK transceiver are solved in the local area wireless transmission system according to the present invention. Moreover, transmission quality and transmission range are improved by applying the present invention to the local area wireless transmission system for a digital multimedia data using a MINO antenna and a UWB technology.

It will be apparent to those skilled in the art that various modifications and variations can be made in a local area wireless transmission system and a wireless transmission method using the system of the present invention without departing from the spirit or scope of the invention. Thus, it is intended that the present invention cover the modifications and variations of this invention provided they come within the scope of the appended claims and their equivalents.

What is claimed is:

1. A local area wireless transmission system comprising:
    at least one transmitter wirelessly transmitting a multimedia data signal;
    at least one master receiver transmitting a synchronization control signal and wirelessly receiving the multimedia data signal; and
    at least one receiver wirelessly receiving the multimedia data signal and wiredly retransmitting the multimedia data signal to the at least one master receiver;
    wherein the at least one transmitter and the at least one receiver are disposed within a transmission range of the synchronization control signal so that the at least one transmitter and the at least one receiver can receive the synchronization control signal from the at least one master receiver,
    wherein the at least one master receiver recovers errors in the multimedia data signal by comparing the multimedia data signal that was wirelessly received from the at least one transmitter and the multimedia data signal that was wiredly received from the at least one receiver.

2. The system according to claim 1, wherein the at least one transmitter transmits the multimedia data signal with a first speed, and the at least one master receiver transmits the synchronization control signal with a second speed lower than the first speed.

3. The system according to claim 1, wherein the at least one master receiver comprises:
    a wired interfacing unit receiving the multimedia data signal from the at least one receiver wiredly;
    a wireless receiving unit receiving the multimedia data signal from the at least one transmitter;
    a wireless transmitting unit transmitting the synchronization control signal;
    an error recovery calculating unit recovering errors in the multimedia data signal received by one of the wired interfacing unit and wireless receiving unit; and
    a codec unit converting a digital type of the multimedia data signal in the error recovery calculating unit into an analog type.

4. The system according to claim 1, wherein the at least one master receiver includes a plurality of master receivers using different frequencies, and wherein the at least one transmitter includes a frequency selecting unit that selects one of the plurality of master receivers.

5. The system according to claim 1, wherein the at least one receiver comprises:
    a wireless receiving unit receiving the synchronization control signal from the at least one master receiver and the multimedia data signal from the at least one transmitter;
    a controlling unit controlling the wireless receiving unit and keeping a network synchronization using the synchronization control signal;
    an error recovery calculating unit recovering errors in the multimedia data signal; and
    a wired interfacing unit transmitting the multimedia data signal to the at least one master receiver wiredly.

6. The system according to claim 5, wherein the at least one receiver further comprises a wireless transmitting unit communicating with the at least one master receiver.

7. The system according to claim 1, wherein the at least one transmitter comprises:
    an analog signal inputting unit receiving the multimedia data signal from a wireless multimedia device;
    a codec unit converting an analog type of the multimedia data signal into a digital type;
    a wireless transmitting unit transmitting the multimedia data signal to the at least one master receiver and the at least one receiver;
    a wireless receiving unit receiving the synchronization control signal from the at least one master receiver; and
    a controlling unit controlling the wireless transmitting unit and the wireless receiving unit and keeping a network synchronization using the synchronization control signal.

8. The system according to claim 1, wherein the transmission range of the synchronization control signal is greater than a transmission range of the multimedia data signal.

9. The system according to claim 1, wherein one of the at least one receiver and the at least one master receiver recovers errors in the multimedia data signal.

10. A local area wireless transmission system comprising:
    at least one transmitter wirelessly transmitting a multimedia data signal with a first speed;
    at least one master receiver transmitting a synchronization control signal with a second speed lower than the first speed and wirelessly receiving the multimedia data signal; and
    at least one receiver wirelessly receiving the multimedia data signal and wiredly retransmitting the multimedia data signal to the at least one master receiver;
    wherein the at least one transmitter and the at least one receiver are disposed within a transmission range of the synchronization control signal so that the at least one transmitter and the at least one receiver can receive the synchronization control signal from the at least one master receiver, and
    wherein the at least one master receiver recovers errors in the multimedia data signal by comparing the multimedia data signal that was wirelessly received from the at least one transmitter and the multimedia data signal that was wiredly received from the at least one receiver.

11. A local area wireless transmission method for a digital multimedia data, comprising:
    wirelessly transmitting a multimedia data signal by at least one transmitter;
    transmitting a synchronization control signal by at least one master receiver to form a network synchronization; and
    wirelessly receiving the multimedia data signal by at least one receiver and wiredly retransmitting the multimedia data signal from the at least one receiver to the at least one master receiver;
    wherein the at least one transmitter and the at least one receiver are disposed within a transmission range of the synchronization control signal so that the at least one transmitter and the at least one receiver can receive the synchronization control signal from the at least one master receiver,
    wherein the at least one master receiver recovers errors in the multimedia data signal by comparing the multimedia data signal that was wirelessly received from the at least one transmitter and the multimedia data signal that was wiredly received from the at least one receiver.

12. The method according to claim 11, wherein the at least one transmitter transmits the multimedia data signal with a first speed, and the at least one master receiver transmits the synchronization control signal with a second lower than the first speed.

13. The method according to claim 11, further comprising recovering errors in the multimedia data signal received from the at least one transmitter and the at least one receiver.

14. The method according to claim 11, wherein the at least one transmitter includes a plurality of receivers transmitting the multimedia data signal by a time division type.

15. The method according to claim 11, wherein the at least one master receiver recovers errors in the multimedia data signal by comparing blocks of the multimedia data signal received from the at least one transmitter and the at least one receiver and selecting the blocks without the errors.

16. The method according to claim 15, wherein the at least one master receiver recovers the errors in the multimedia data signal by a forward error correction (FEC) method when all the blocks of the multimedia data signal have the errors.

17. The method according to claim 11, wherein one of the at least one receiver and the at least one master receiver recovers errors in the multimedia data signal.

18. A local area wireless transmission method for a digital multimedia data, comprising:
- wirelessly transmitting a multimedia data signal with a first speed by at least one transmitter;
- transmitting a synchronization control signal with a second speed lower than the first speed by at least one master receiver to form a network synchronization; and
- wirelessly receiving the multimedia data signal by at least one receiver and wiredly retransmitting the multimedia data signal from the at least one receiver to the at least one master receiver;
- wherein the at least one transmitter and the at least one receiver are disposed within a transmission range of the synchronization control signal so that the at least one transmitter and the at least one receiver can receive the synchronization control signal from the at least one master receiver,
- wherein the at least one master receiver recovers errors in the multimedia data signal by comparing the multimedia data signal that was wirelessly received from the at least one transmitter and the multimedia data signal that was wiredly received from the at least one receiver.

* * * * *